US011422272B2

United States Patent
Mino et al.

(10) Patent No.: US 11,422,272 B2
(45) Date of Patent: Aug. 23, 2022

(54) SEISMIC SENSOR AND EARTHQUAKE DETERMINATION METHOD

(71) Applicant: Omron Corporation, Kyoto (JP)

(72) Inventors: Hiroyuki Mino, Osaka (JP); Naotsugu Ueda, Funabashi (JP)

(73) Assignee: Omron Corporation, Kyoto (JP)

( * ) Notice: Subject to any disclaimer, the term of this patent is extended or adjusted under 35 U.S.C. 154(b) by 414 days.

(21) Appl. No.: 16/489,893

(22) PCT Filed: Nov. 28, 2017

(86) PCT No.: PCT/JP2017/042600
§ 371 (c)(1),
(2) Date: Aug. 29, 2019

(87) PCT Pub. No.: WO2018/168101
PCT Pub. Date: Sep. 20, 2018

(65) Prior Publication Data
US 2020/0012003 A1    Jan. 9, 2020

(30) Foreign Application Priority Data

Mar. 14, 2017 (JP) .............................. JP2017-048485

(51) Int. Cl.
*G01V 1/18* (2006.01)
*G01V 1/00* (2006.01)
*G01V 1/16* (2006.01)

(52) U.S. Cl.
CPC ................ *G01V 1/18* (2013.01); *G01V 1/008* (2013.01); *G01V 1/164* (2013.01); *G01V 2210/1232* (2013.01)

(58) Field of Classification Search
CPC .......... G01V 1/18; G01V 1/008; G01V 1/164; G01V 2210/1232
See application file for complete search history.

(56) References Cited

U.S. PATENT DOCUMENTS 10,613,240 B2 *   4/2020   Ueda ...................... G01V 1/162
2003/0184445 A1   10/2003  Chen et al.
(Continued)

FOREIGN PATENT DOCUMENTS

CN    110537112 A  * 12/2019   ............... G01V 1/18
EP        2944979 A1    11/2015
(Continued)

OTHER PUBLICATIONS

Office Action issued in the counterpart JP Patent Application No. 2017-048485, dated Mar. 3, 2020 (7 pages).
(Continued)

*Primary Examiner* — Daniel Pihulic
(74) *Attorney, Agent, or Firm* — Osha Bergman Watanabe & Burton LLP

(57) ABSTRACT

Erroneous determination of noise as an earthquake is reduced in a seismic sensor. The seismic sensor operates in a power saving mode and a measurement mode in which power consumption is larger than that in the power saving mode. The seismic sensor includes: a measurement unit configured to measure acceleration; an earthquake determinator configured to transition from the power saving mode to the measurement mode when the acceleration measured by the measurement unit exceeds a predetermined threshold, to determine whether an earthquake is generated based on the acceleration measured in the measurement mode; and an index calculator configured to calculate an index value indicating a scale of the earthquake when the earthquake determinator determines that the earthquake is generated.
(Continued)

The earthquake determinator determines whether the earthquake is generated by determining whether a predetermined condition is satisfied, the predetermined condition being determined based on the acceleration measured in at least one determination period, each determination period into which a period after the power saving mode transitions to the measurement mode is divided being set to a processing unit, and the measurement mode transitions to the power saving mode when the earthquake determinator determines that the earthquake is not generated.

10 Claims, 13 Drawing Sheets

(56) References Cited

U.S. PATENT DOCUMENTS

| | | | |
|---|---|---|---|
| 2017/0003406 A1 | 1/2017 | Ueda et al. | |
| 2018/0188396 A1 | 7/2018 | Sakuma et al. | |
| 2020/0012003 A1* | 1/2020 | Mino | G01V 1/008 |
| 2021/0141107 A1* | 5/2021 | Mino | G01V 1/008 |

FOREIGN PATENT DOCUMENTS

| | | | | |
|---|---|---|---|---|
| EP | 3598179 A1 * | 1/2020 | | G01V 1/18 |
| EP | 3647825 A1 * | 5/2020 | | G01V 1/18 |
| EP | 3647825 A4 * | 3/2021 | | G08B 29/185 |
| JP | 2000-162032 A | 6/2000 | | |
| JP | 2001-059761 A | 3/2001 | | |
| JP | 2014/134501 A | 7/2014 | | |
| JP | 2017/015603 A | 1/2017 | | |
| JP | 2017-015604 A | 1/2017 | | |
| KR | 102104536 B1 * | 4/2020 | | G01V 1/164 |
| WO | 2017002946 A1 | 1/2017 | | |
| WO | WO-2019003505 A1 * | 1/2019 | | G08B 29/185 |

OTHER PUBLICATIONS

International Search Report issued in PCT/JP2017/042600 dated Feb. 6, 2018 (1 page).

Written Opinion of the International Searching Authority issued in PCT/JP2017/042600 dated Feb. 6, 2018 (10 pages).

Extended European Search Report issued in European Application No. 17901116.8, dated Dec. 11, 2020 (9 pages).

* cited by examiner

Fig. 10

| | Condition | | Difference between maximum value and minimum value of acceleration in current determination period > 100 gal | It is determined that noise is generated when condition is not satisfied<br>It is determined that earthquake is generated when condition is satisfied |
|---|---|---|---|---|
| Determination periods 1 and 2 | | | | |
| Determination periods 3 to 5 | Sub-condition 1 | Difference between maximum value and minimum value of acceleration in current determination period > 100 gal | It is determined that noise is generated when both sub-conditions are not satisfied<br>Transition to subsequent determination period is performed when one of sub-conditions is satisfied<br>It is determined that earthquake is generated when both sub-conditions are satisfied |
| | Sub-condition 2 | (Difference between maximum value and minimum value of acceleration in current determination period) − (Difference between maximum value and minimum value of acceleration in previous determination period) ≥ 40 gal | |
| Determination period 6 | Sub-condition 1 | Difference between maximum value and minimum value of acceleration in current determination period > 100 gal | It is determined that noise is generated when both sub-conditions are not satisfied<br>It is determined that earthquake is generated when one of sub-conditions is satisfied |
| | Sub-condition 2 | (Difference between maximum value and minimum value of acceleration in current determination period) − (Difference between maximum value and minimum value of acceleration in previous determination period) ≥ 40 gal | |

Fig. 11

| Determination period | Condition type | Condition | Result |
|---|---|---|---|
| Determination period 1 | Condition | Difference between maximum value and minimum value of acceleration in current determination period > 100 gal | It is determined that noise is generated when condition is not satisfied. Transition to subsequent determination period is performed when condition is satisfied |
| Determination periods 2 and 3 | Sub-condition 1 | Difference between maximum value and minimum value of acceleration in current determination period > 100 gal | It is determined that noise is generated when sub-condition 1 is not satisfied. Transition to subsequent determination period is performed when one of sub-conditions is satisfied |
| | Sub-condition 2 | (Difference between maximum value and minimum value of acceleration in current determination period) − (Difference between maximum value and minimum value of acceleration in previous determination period) ≥ 10 gal | It is determined that earthquake is generated when both sub-conditions are satisfied |
| Determination periods from determination period 4 | Sub-condition 1 | Difference between maximum value and minimum value of acceleration in current determination period > 100 gal | It is determined that noise is generated when sub-condition 1 is not satisfied. Transition to subsequent determination period is performed when one of sub-conditions is satisfied |
| | Sub-condition 3 | (Difference between maximum value and minimum value of acceleration in current determination period) − (Difference between maximum value and minimum value of acceleration in previous determination period) ≥ 10 gal | Returning to determination period 1 is performed when both sub-conditions are satisfied |

Fig. 13

| | | | |
|---|---|---|---|
| Determination periods 1 to 6 | Sub-condition 1 | Difference between maximum value and minimum value of acceleration in current determination period > 100 gal in latest three determination periods including current determination period | It is determined that noise is generated when sub-condition 1 is not satisfied<br>It is determined that earthquake is generated when sub-conditions 1 is satisfied and when one of sub-conditions 2 and 3 is satisfied<br>Otherwise transition to subsequent determination period is performed |
| | Sub-condition 2 | (Difference between maximum value and minimum value of acceleration in sixth determination period) − (Difference between maximum value and minimum value of acceleration in current determination period) ≥ 10 gal | |
| | Sub-condition 3 | (Difference between maximum value and minimum value of acceleration in current determination period) − (Difference between maximum value and minimum value of acceleration in previous determination period) ≥ 10 gal | |
| Determination periods from determination period 7 | Sub-condition 1 | Difference between maximum value and minimum value of acceleration in current determination period > 100 gal in latest three determination periods including current determination period | It is determined that noise is generated when sub-condition 1 is not satisfied<br>Transition to subsequent determination period is performed when one of sub-conditions is satisfied<br>Returning to determination period 1 is performed when both sub-conditions are satisfied |
| | Sub-condition 4 | (Difference between maximum value and minimum value of acceleration in current determination period) − (Difference between maximum value and minimum value of acceleration in previous determination period) ≥ 40 gal | |

SEISMIC SENSOR AND EARTHQUAKE DETERMINATION METHOD

TECHNICAL FIELD

The present invention relates to a seismic sensor and an earthquake determination method.

BACKGROUND ART

In the case of a device, such as a seismic sensor used to interrupt gas or electricity during generation of an earthquake, which is provided in a meter box or the like and driven by a battery, it is desirable to particularly reduce standby power. However, while the seismic sensor using a microcontroller can obtain an index value for evaluating a scale of the earthquake through arithmetic processing, power consumption tends to become larger as compared with a mechanical seismic sensor that is energized by a conventionally-used vibration. Depending on an environment in which the device is installed, noise due to passage of a vehicle, construction, and the like is also measured, and a degree of noise to be measured also varies. The power consumption of the seismic sensor will increase when misdetection of the environmental noise as the earthquake is repeated.

Conventionally, in the seismic sensor that makes the earthquake determination after transition from a power saving mode to a measurement mode and returns to the power saving mode when it is determined that the earthquake is generated, there has been proposed a technique of improving accuracy of the determination by performing filtering on measured acceleration to remove a noise component (for example, Patent Document 1).

PRIOR ART DOCUMENT

Patent Document

Patent Document 1: Japanese Unexamined Patent Publication No. 2017-15604

SUMMARY OF THE INVENTION

Problems to be Solved by the Invention

Conventionally, whether the vibration measured by the seismic sensor is the earthquake or the noise is determined based on the vibration immediately after the seismic sensor transitions from the power saving mode to the measurement mode. However, depending on a character of the installation location of the sensor and a character of the noise, sometimes the vibration having a certain scale or more continues for a certain period of time even in the noise. For example, in the case that the sensor is installed on a relatively long pipe or a wall surface having low rigidity, sometimes the vibration is prolonged and erroneously detected as the earthquake when some sort of impact is provided to the sensor. Sometimes an external device cooperating with the seismic sensor determines that the vibration intensity is higher than a predetermined level, and erroneously outputs a signal in order to interrupt the supply of energy such as gas or electricity.

The present invention has been made in view of the above problems, and an object of the present invention is to reduce the erroneous determination of the noise as the earthquake in the seismic sensor.

Means for Solving the Problem

The seismic sensor according to the present invention operates in a power saving mode and a measurement mode in which power consumption is larger than that in the power saving mode. The seismic sensor includes: a measurement unit configured to measure acceleration; an earthquake determinator configured to transition from the power saving mode to the measurement mode when the acceleration measured by the measurement unit exceeds a predetermined threshold, to determine whether an earthquake is generated based on the acceleration measured in the measurement mode; and an index calculator configured to calculate an index value indicating a scale of the earthquake when the earthquake determinator determines that the earthquake is generated. The earthquake determinator determines whether the earthquake is generated by determining whether a predetermined condition is satisfied, the predetermined condition being determined based on the acceleration measured in at least one determination period, each determination period into which a period after the power saving mode transitions to the measurement mode is divided being set to a processing unit, and the measurement mode transitions to the power saving mode when the earthquake determinator determines that the earthquake is not generated.

The detailed condition that determines whether the earthquake is generated can be defined by dividing the period after the transition to the measurement mode into a plurality of periods. That is, the erroneous determination of noise as an earthquake can be reduced.

The earthquake determinator may transition from the measurement mode to the power saving mode without performing processing in a subsequent determination period when the earthquake determinator determines that the earthquake is not generated in one of a plurality of the determination periods. The power consumption can be suppressed by not performing processing in the following period.

The earthquake determinator may not perform the processing in the subsequent determination period and the index calculator calculates the index value when the earthquake determinator determines that the earthquake is generated in one of the plurality of determination periods. For the earthquake having large vibration strength, an interruption output can be output to interrupt electricity or gas. By omitting the processing in the subsequent determination period at the timing when it is determined that the earthquake is generated, a signal can be output in order to promptly interrupt supply of energy when it is determined that the earthquake larger than a predetermined scale is generated.

The earthquake determinator may determine that the earthquake is generated when a number of determination periods satisfying the condition among the plurality of determination periods exceeds a predetermined threshold, and otherwise the measurement mode transitions to the power saving mode. Consequently, the condition of the earthquake determination can be defined in more detail, and it is possible to immediately transition to the subsequent processing at a point of time it is determined whether the earthquake is generated.

The earthquake determinator may determine that the earthquake is generated when a number of determination periods continuously satisfying the condition among the plurality of determination periods exceeds a predetermined threshold, and otherwise the measurement mode transitions to the power saving mode. With such a configuration as well, the condition of the earthquake determination can be defined in more detail, and it is possible to immediately transition to the subsequent processing at a point of time it is determined whether the earthquake is generated.

The condition in a part of the plurality of determination periods may be different from the condition in other determination periods. With such a configuration, the conditions of the earthquake determination can also be defined in more detail.

It may be determined that the condition is satisfied when a maximum speed value or a maximum displacement amount, which is calculated from a difference between a maximum value and a minimum value of values based on the acceleration, an average value, a sum of the average value and a variance value, the variance value, an integrated value, a rate of change, spectral intensity, an integral value, an spectrum intensity (SI) value, the maximum value, a response speed value, and the acceleration, and a predetermined threshold have a predetermined magnitude relationship or when a peak frequency is a predetermined frequency. Specifically, various values corresponding to the acceleration can be used to determine whether the earthquake is generated.

A plurality of sub-conditions constituting the condition may be defined for at least one of the plurality of determination periods, and the earthquake determinator may determine that the condition is satisfied when at least a predetermined number of sub-conditions among the plurality of sub-conditions is satisfied. With such a configuration, the conditions of the earthquake determination can also be defined in more detail.

In a predetermined determination period among the plurality of determination periods, the earthquake determinator may perform processing from the processing in the determination period immediately after the power saving mode transitions to the measurement mode when a value corresponding to the acceleration measured in the determination period is larger than a value corresponding to the acceleration measured in a period before the determination period. Consequently, for example, even if the second noise is detected before the first noise converges, the earthquake determination can appropriately be made.

The contents described in the means for solving the problems can be combined without departing from the object and technical ideas of the present invention. The present invention can also be recognized as an earthquake determination method performed by the seismic sensor.

Effect of the Invention

Erroneous determination of noise as an earthquake can be reduced in the seismic sensor.

BRIEF DESCRIPTION OF THE DRAWINGS

FIG. 10 is a view illustrating an example of setting of a plurality of sub-conditions for a determination period.
FIG. 11 is a view illustrating another example of the setting of the plurality of sub-conditions for the determination period.
FIG. 13 is a view illustrating still another example of the setting of the plurality of sub-conditions for the determination period.

MODE FOR CARRYING OUT THE INVENTION

Hereinafter, a seismic sensor according to an embodiment of the present invention will be described with reference to the drawings. However, the embodiment described below illustrates an example of the seismic sensor, and the seismic sensor according to the present invention is not limited to the following configuration.

<Device Configuration>

Figure 1:
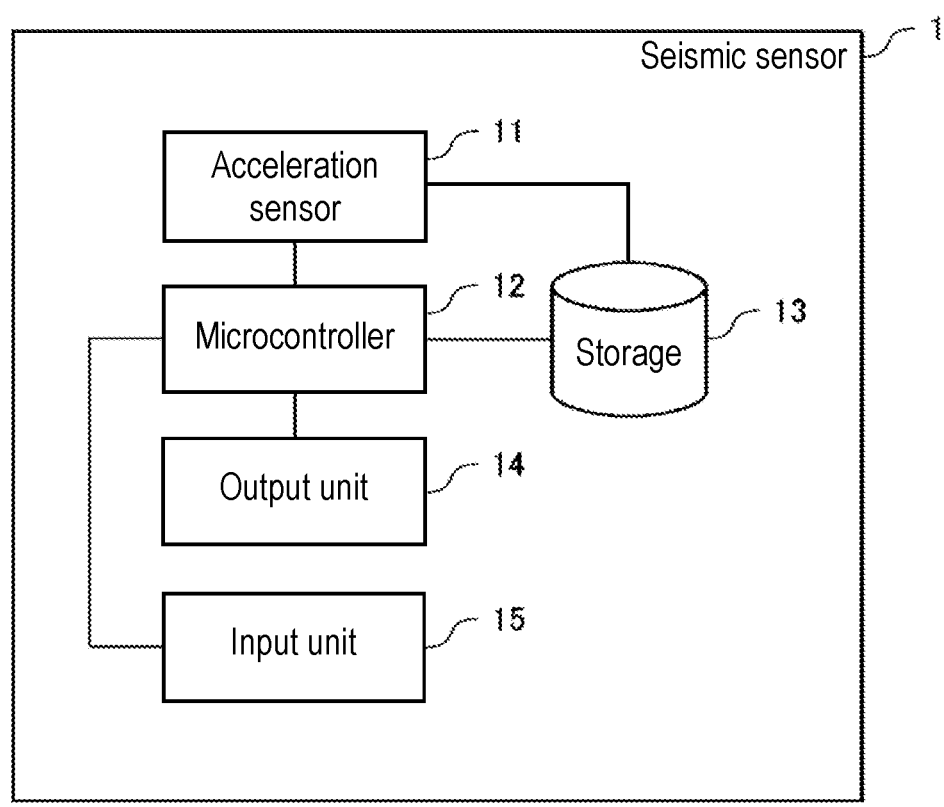
FIG. 1 is a device configuration diagram illustrating an example of a seismic sensor.

FIG. 1 is a device block diagram illustrating an example of the seismic sensor of the embodiment. A seismic sensor 1 includes an acceleration sensor 11, a microcontroller 12, a storage 13, an output unit 14, and an input unit 15. For example, the acceleration sensor 11 is an acceleration sensor using a piezoelectric element or an acceleration sensor that detects an electrostatic capacity between electrodes. The acceleration measured (also referred to as "sampling") by the acceleration sensor 11 is output to the microcontroller 12. For example, the microcontroller 12 is a general-purpose integrated circuit. The microcontroller 12 acquires the acceleration measured by the acceleration sensor 11 at a predetermined period, and detects generation of an earthquake based on the acceleration, or calculates an index value indicating scale of the earthquake. Depending on the situation, the microcontroller 12 operates in different forms of an active mode or a sleep mode. The sleep mode is an operation form in which the microcontroller 12 operates while limiting a function such as stops execution of an instruction while accepting interrupt, or stops supply of a clock, thereby reducing power consumption as compared with the active mode. In the active mode, the microcontroller 12 performs processing of determining whether a detected vibration is an earthquake or a noise, or calculates an index value indicating the scale of the earthquake. The storage 13 is a temporary storage such as a random access memory (RAM) or a non-volatile memory such as an erasable programmable read only memory (EPROM). For example, the measured acceleration and a threshold used for an earthquake determination are stored in the storage 13. The storage 13 may be a memory incorporated in the acceleration sensor 11 or the microcontroller 12. For example, the output unit 14 is an output terminal of the microcontroller 12. For example, in the case that the generation of the earthquake is determined, the microcontroller 12 outputs information indicating the generation of the earthquake and the scale of the earthquake to another device through the output unit 14. The input unit 15 is an input terminal of the microcontroller 12. For example, the microcontroller 12 may receive an operation of a switch (not illustrated) or input of a command from another device through the input unit 15. A high-pass filter (not illustrated) may be provided between the acceleration sensor 11 and the microcontroller 12 to remove a gravity component. The microcontroller 12 may handle the acceleration measured by the acceleration sensor 11 by converting the acceleration into an absolute value of the acceleration based on a predetermined offset.

<Functional Configuration>

Figure 2:
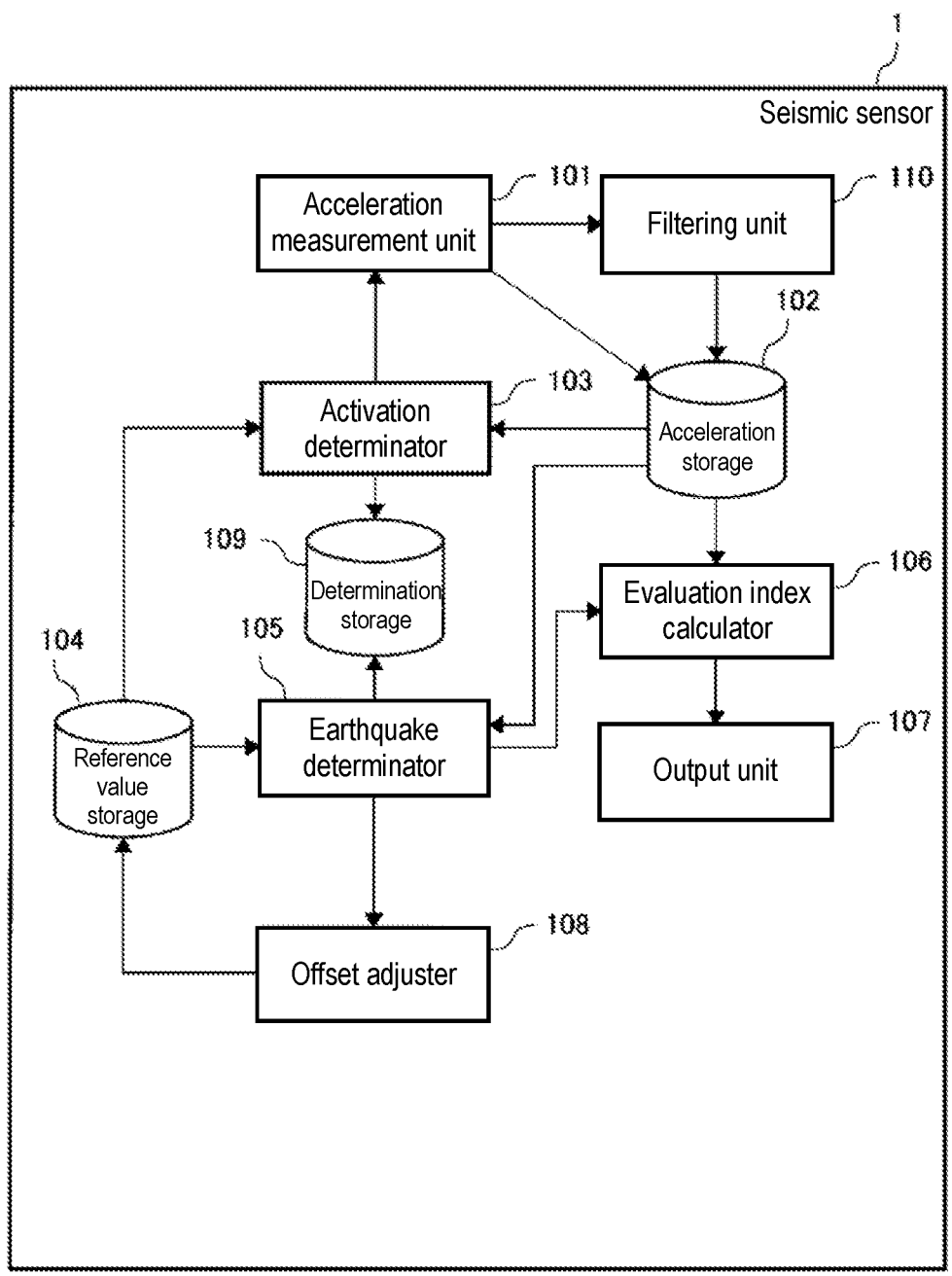
FIG. 2 is a functional block diagram illustrating an example of the seismic sensor.

FIG. 2 is a functional block diagram illustrating an example of the seismic sensor 1. The seismic sensor 1 includes an acceleration measurement unit 101, an acceleration storage 102, an activation determinator 103, a reference value storage 104, an earthquake determinator 105, an evaluation index calculator 106, an output unit 107, and an offset adjuster 108, the determination storage 109, and a filtering unit 110. The acceleration sensor 11 or the microcontroller 12 illustrated in FIG. 1 operates based on a predetermined program, thereby constructing the acceleration measurement unit 101, the activation determinator 103, the earthquake determinator 105, the evaluation index calculator 106, the offset adjuster 108, and the filtering unit 110. The acceleration storage 102, the reference value storage 104, and the determination storage 109 are constructed with the storage 13 of FIG. 1. The microcontroller 12 operates in the active mode, thereby constructing the earthquake determinator 105 and the evaluation index calculator 106. The microcontroller 12 and the output unit 14 in FIG. 1 operate based on the predetermined program, thereby constructing the output unit 107.

The acceleration measurement unit 101 measures the acceleration at a predetermined period. Typically, the acceleration measurement unit 101 repeats the acceleration measurement ay a relatively low speed (that is, a relatively large measurement period, also referred to as a "first period"). In the case that sampling is performed at such a low speed, the microcontroller 12 basically operates in the sleep mode. Such an operating state with low power consumption is also referred to as a "power saving mode" or a "standby state". In other words, the "power saving mode" is an operation state in which the low-speed sampling is performed. At this point, the microcontroller 12 operates in the sleep mode in which the function is limited, so that the power consumption is suppressed. In the case that the acceleration measurement unit 101 detects the vibration larger than a threshold previously set in the reference value storage 104, the acceleration measurement unit 101 repeats the acceleration measurement at a higher speed than that of the low-speed sampling (that is, a relatively large measurement period, also referred to as a "second period"). In the case that the high-speed sampling is performed, the microcontroller 12 operates in the sleep mode or the active mode. In the case that the earthquake determinator 105 or the evaluation index calculator 106 performs processing, the microcontroller 12 operates in the active mode. The operation state at the time of high-speed sampling is also referred to as a "measurement mode", and transition of the operation state from the power saving mode to the measurement mode is also referred to as "activation". In other words, the "measurement mode" is the operation state in which the high-speed sampling is performed. At this point, the microcontroller 12 may operate in the sleep mode in which the function is limited or operate in the active mode in which the microcontroller 12 can operate with a maximum calculation capability. In the measurement mode, the power consumption becomes larger than that in the power saving mode because the sampling period is shortened and the microcontroller 12 switches from the sleep mode to the active mode.

The filtering unit 110 performs filtering processing on the value of the acceleration measured by the acceleration measurement unit 101, and causes the acceleration storage 102 to hold the filtered acceleration. In the embodiment, the filtering unit 110 acts as what is called a digital filter. An existing technique can be adopted as the specific filtering technique. For example, the filtering unit 110 functions as a low-pass filter by calculating a moving average of absolute values of acceleration.

The acceleration storage 102 holds the value of the acceleration measured by the acceleration measurement unit 101 or the value of the acceleration filtered by the filtering unit 110. The activation determinator 103 compares the value of the acceleration measured by the acceleration measurement unit 101 to an activation threshold held in the reference value storage 104, and activates the microcontroller 12 from the power saving mode to the measurement mode when the value of the acceleration exceeds the activation threshold. The earthquake determinator 105 determines whether the measured acceleration indicates the earthquake or the noise using the acceleration measured in the measurement mode by the acceleration measurement unit 101 and the threshold value previously set in the reference value storage 104. In the embodiment, the earthquake determinator 105 divides the cycle after the activation determinator 103 detects the acceleration exceeding the activation threshold into units of a plurality of determination periods, and performs the processing in each determination period.

When the earthquake determinator 105 determines that the measured acceleration is the earthquake, the evaluation index calculator 106 calculates an evaluation index indicating the scale of the earthquake. For example, it is assumed that an SI (Spectrum Intensity) value is calculated as an earthquake evaluation index. The output unit 107 outputs the calculated SI value to an external device. In the case that the earthquake is determined to be larger than a predetermined scale based on the SI value, for example, the external device may perform processing of interrupting the supply of energy such as gas and electricity.

On the other hand, when the earthquake determinator 105 determines that the measured acceleration is the noise, the offset adjuster 108 performs what is called offset adjustment. In the embodiment, a noise component, such as an amount of change in the measurement value generated with a temporal change of the sensor, an amount of change in the measurement value generated with a temperature change, and an amount of change in the measurement value generated by a change in a direction of gravity acceleration with respect to the sensor in the case that the posture of the installed sensor is inclined due to some reason, which is included in the measured acceleration, is referred to as an offset component. For example, the offset adjuster 108 calculates a median of the maximum values and the minimum values of the acceleration determined to be noise and the average value of the acceleration as the offset component.

Figure 3:
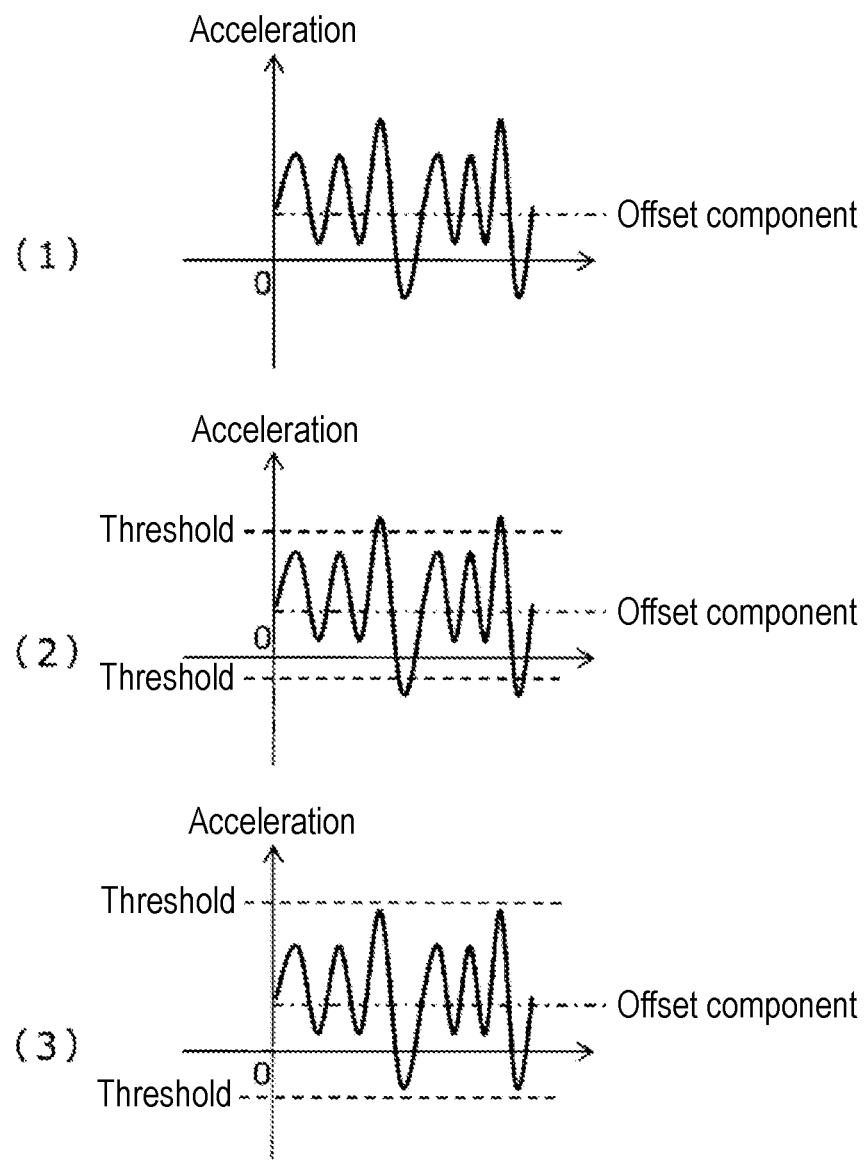
FIG. 3 is a view illustrating acceleration measured in an embodiment and a threshold.

FIG. 3 is a view illustrating the acceleration measured in the embodiment, the offset component, and the threshold. In the graph of FIG. 3, a vertical axis represents magnitude of the acceleration, and a horizontal axis represents passage of time. As illustrated in a part (1) of FIG. 3, in the case that the vibration indicated by a thick solid line is measured, for example, the offset component can be obtained as an average value of the acceleration as indicated by an alternate long and short dash line. The calculated offset component is stored in the reference value storage 104, and used for the activation determination performed by the activation determinator 103 and the earthquake determination performed by the earthquake determinator 105. Further, as illustrated in parts (2), (3) of FIG. 3, in the case that the vibration indicated by the thick solid line is measured, the threshold is defined as a value relative to the offset component as indicated by the broken line.

<Seismic Processing 1>

Figure 4:
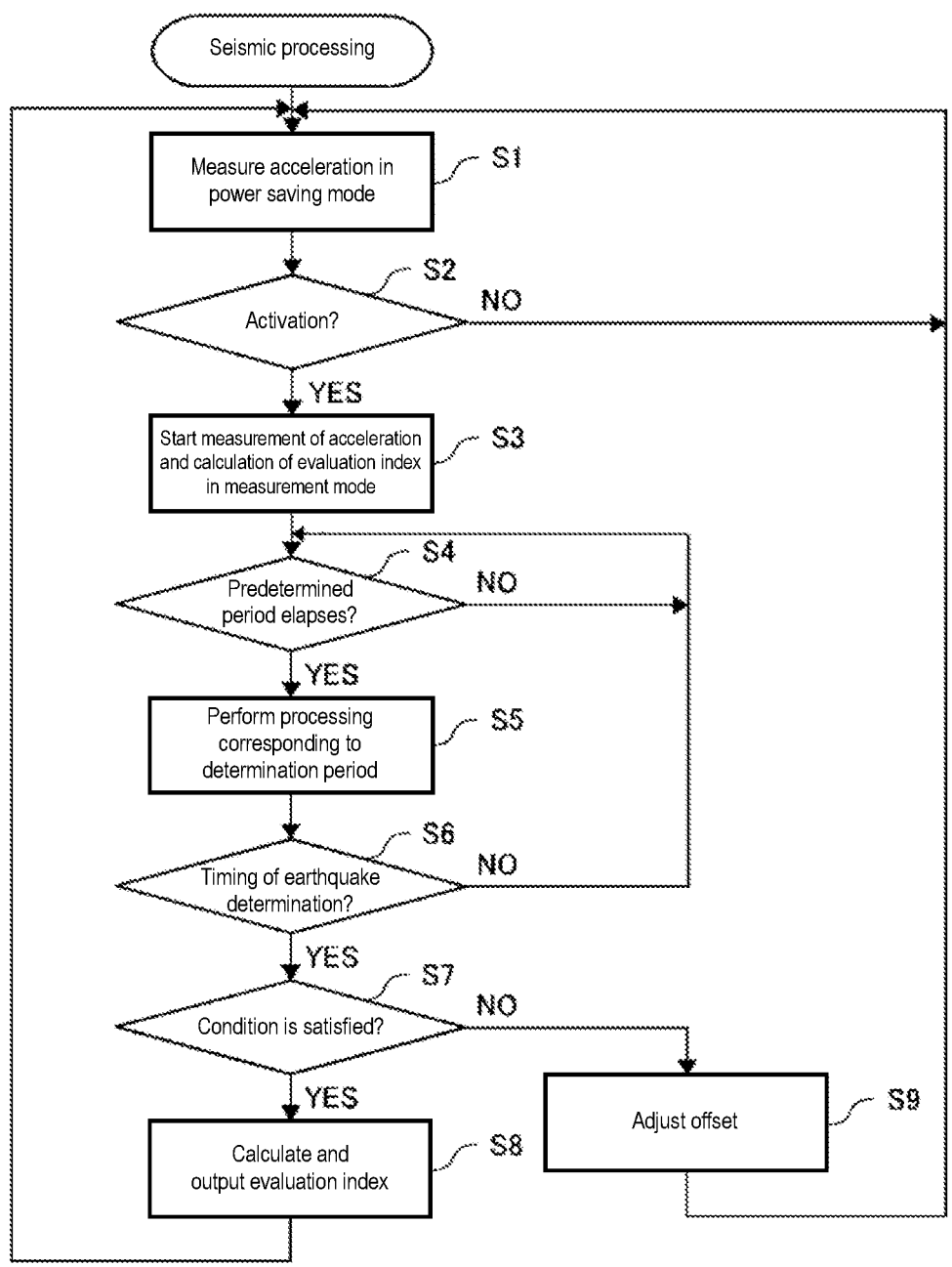
FIG. 4 is a flowchart illustrating an example of seismic processing according to a first embodiment.

FIG. 4 is a flowchart illustrating an example of seismic processing according to a first embodiment. The acceleration measurement unit 101 of the seismic sensor 1 measures the acceleration in the power saving mode (S1 in FIG. 4). In the power saving mode, the acceleration measurement unit 101 performs the low-speed sampling. The activation determinator 103 of the seismic sensor 1 determines whether to activate (that is, the transition to the measurement mode) (S2). In step S2, when the acceleration measured in S1 is less than or equal to the threshold (also referred to as the "activation threshold") in FIG. 3 (NO in S2), the processing transitions to S1 to continue the power saving mode (low-speed sampling). For example, the activation threshold is a value representing the acceleration of 50 gal, and is previously stored in the reference value storage 104. On the other hand, when the acceleration measured in S1 is larger than the threshold in FIG. 3 (YES in S2), the acceleration measurement unit 101 transitions to the measurement mode. As illustrated in the parts (2), (3) of FIG. 3, the activation threshold is a relative value based on the offset. In the measurement mode, the acceleration measurement unit 101 performs the high-speed sampling.

Subsequently, the acceleration measurement unit 101 measures the acceleration by high-speed sampling in the measurement mode, the filtering unit 110 performs the filtering processing on the measured acceleration, a result value is stored in the acceleration storage 102, and the evaluation index calculator 106 starts the calculation of a predetermined evaluation index (S3). The microcontroller 12 may transition to the active mode to perform the filtering processing, or the acceleration sensor 11 may perform the filtering processing while the microcontroller 12 remains in the sleep mode. The filtering processing in S3 is not necessarily performed.

For example, the calculation of the SI value is started as the evaluation index. The SI value is an example of the earthquake evaluation index, and is a value that is correlated with a degree of damage to a building. The output unit 107 of the seismic sensor 1 outputs the calculated evaluation index to another device in later step. Specifically, the SI value can be obtained by the following equation (1).

[Mathematical formula 1]

$$SI = \frac{1}{2.4}\int_{0.1}^{2.5} Sv(T, h)dT \quad (1)$$

The SI value is used as an index representing destructive force of earthquake motion by averaging a velocity response spectrum integral value between 0.1 seconds and 2.5 seconds that is a natural period of a high-rigidity structure. Where Sv is a velocity response spectrum, T is a period, and h is an attenuation constant.

The earthquake determinator 105 of the seismic sensor 1 determines whether a predetermined period elapses since the generation of the vibration (S4). In the first embodiment, whether the detected vibration is the earthquake or the noise is determined by performing predetermined processing for a plurality of determination periods. Whether one determination period elapses is determined in S4. When the predetermined period does not elapse (NO in S4), the earthquake determinator 105 repeats the determination in S4, and waits for the passage of the predetermined period. At this point, the measurement of the acceleration and the calculation of the evaluation index, which are started in S3, are continued.

On the other hand, when the predetermined period elapses (YES in S4), the earthquake determinator 105 performs processing correlated with each of the plurality of determination periods (S5). It is assumed that predetermined processing is previously associated with a first determination period, a second determination period, and the like. For example, a difference between the maximum value and the minimum value of the acceleration measured in the determination period may be calculated, or using the moving average of the absolute value of the acceleration (also referred to as a "filter value"), a difference between the maximum value and the minimum value of the filter value in a predetermined period (for example, 1 second) may be calculated. For example, the first determination period may be set to 1.0 second from the generation of the vibration, and the second determination period may be set to about 1.0 second to about 2.5 seconds. Different processing may be performed in each of the plurality of determination periods, and processing of the earthquake determination may not be performed in some of the determination periods.

After performing processing corresponding to the determination period in S5, the earthquake determinator 105 determines whether it is predetermined timing of performing the earthquake determination (S6). For example, it is assumed that timing after each of the plurality of determination periods or timing after a predetermined determination period among the plurality of determination periods is previously determined as the timing of performing the earthquake determination. When it is not the timing of performing the earthquake determination (NO in S6), the earthquake determinator 105 returns to S4 to repeat the processing.

On the other hand, when it is the timing of performing the earthquake determination (YES in S6), the earthquake determinator 105 determines whether a predetermined condition is satisfied (S7). Specifically, the earthquake determinator 105 determines whether the detected acceleration is caused by the earthquake or the noise based on the result of the processing performed in each determination period. For example, the detected acceleration may be determined as the earthquake when the difference between the maximum value and the minimum value of the acceleration measured in the determination period and the predetermined threshold value have a predetermined magnitude relationship.

Figure 5:
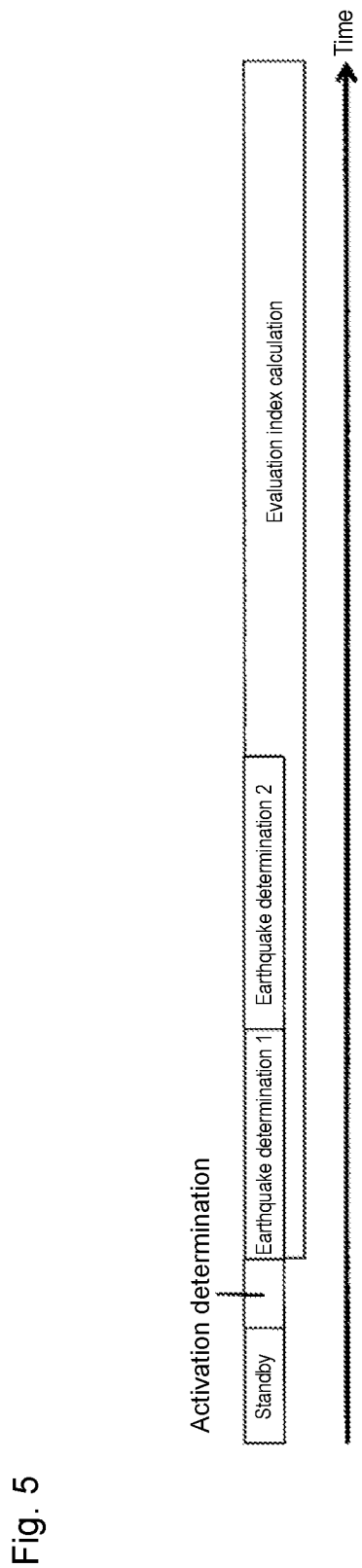
FIG. 5 is a view illustrating an earthquake determination of the first embodiment.

FIG. 5 is a view illustrating the earthquake determination of the first embodiment. In S4 to S7 of FIG. 4, processing in FIG. 5 is performed. In FIG. 5, an arrow from the left to the right indicates the passage of time, and each rectangle indicates the processing performed by the seismic sensor 1. The seismic sensor 1 operating in the power saving mode measures the acceleration by the low-speed sampling in S1 of FIG. 4 (standby in FIG. 5). Subsequently, using the measured acceleration, the activation determination is performed in S2 of FIG. 4 (activation determination in FIG. 5), and the activation is performed when the acceleration exceeds the activation threshold. When the first predetermined period elapses in S4 of FIG. 4, the earthquake determinator 105 performs the processing for each determination period in S5. As illustrated in FIG. 5, the first embodiment includes two determination periods, and the pieces of processing of earthquake determination 1 and earthquake determination 2 are performed. In the earthquake determination 1, the determination of the earthquake is not made, and processing of ignoring the acceleration measured in the first determination period is performed. After the first determination period, it is determined in S6 of FIG. 4 that it is not the timing of performing the earthquake determination. When the second predetermined period elapses in S4 of FIG. 4, the earthquake determination 2 in FIG. 5 is performed in S5. The difference between the maximum value and the minimum value of the acceleration measured by the acceleration measurement unit 101 in the period is obtained in the second determination period. After the second determination period, it is determined in S6 of FIG. 4 that it is the timing of the earthquake determination. In S7 of FIG. 4, when the difference between the maximum value and the minimum value of the acceleration measured in the second determination period exceeds 100 gal that is the predetermined threshold, it is determined that an earthquake is generated.

When it is determined in S7 that the earthquake is generated (YES in S7), the evaluation index calculator 106 of the seismic sensor 1 calculates the evaluation index indicating the scale of the earthquake (S8). In calculating the evaluation index, the microcontroller 12 operates in the active mode. The evaluation index can be calculated by the equation (1).

On the other hand, when it is determined in S7 that the earthquake is not generated (NO in S7), the offset adjuster 108 of the seismic sensor 1 adjusts the offset (S9). In step S9, for example, the average value of the acceleration indicated by the alternate long and short dash line in the part (1) of FIG. 3 is obtained as the offset. In this way, the threshold is adjusted.

<Effect>

Figure 6:
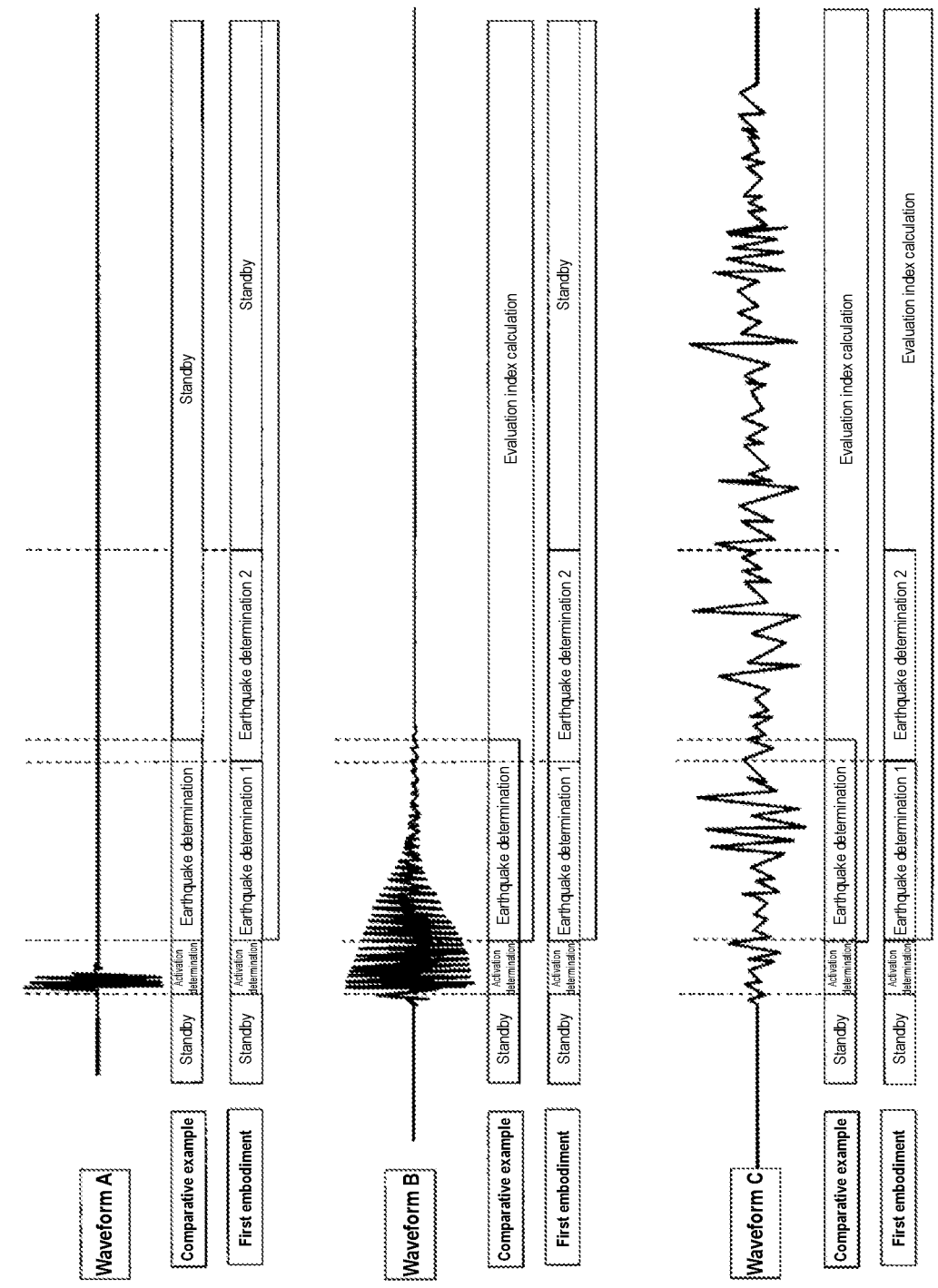
FIG. 6 is a view illustrating an effect of the first embodiment.

FIG. 6 is a view illustrating the effect of the seismic processing 1. A "waveform A" in FIG. 6 illustrates an example of schematic measurement data when the noise is generated in a relatively short time. A "waveform B" illustrates an example of schematic measurement data when the noise that lasts for a relatively long time is generated. A "waveform C" illustrates an example of schematic measurement data when the earthquake is generated. The processing performed in a comparative example and the seismic processing 1 at each time is illustrated below each waveform.

The comparative example includes one determination period, and whether the earthquake or the noise is generated is determined based on the acceleration immediately after the activation. On the other hand, as illustrated in FIG. 5, the first embodiment includes the two determination periods after the activation, the earthquake determination is not made in the first determination period, and the earthquake determination is made based on the acceleration measured in the second determination period. As described above, the detailed condition for the earthquake determination can be set by determining whether the earthquake is generated with each determination period divided into the plurality of units as a processing unit.

For example, in the case that the noise of a short time less than 1 second is detected as in the waveform A, the acceleration is not detected even in the earthquake determination processing of the comparative example, and it is determined that the earthquake is not generated. On the other hand, also for the earthquake sensing process 1, the difference between the maximum value and the minimum value of the acceleration measured in the second determination period does not exceed the predetermined threshold, so that it is determined that the earthquake is not generated.

For the waveform B, in the earthquake determination processing of the comparative example, the acceleration is measured in the determination period immediately after the activation, and the earthquake determination value such as the difference between the maximum value and the minimum value of the acceleration exceeds the predetermined threshold, so that it is determined that the earthquake is generated. In this case, in order to calculate the evaluation index such as the SI value, the seismic sensor 1 operates for a relatively long time (for example, 3 minutes) in the measurement mode with high power consumption. Depending on the magnitude of the acceleration value measured in the first determination period and the second determination period, the evaluation index exceeds the predetermined threshold, and an energy interruption signal is output. That is, interruption output is generated in spite of not the earthquake but the noise. On the other hand, for the seismic processing 1, the difference between the maximum value and the minimum value of the acceleration measured in the second determination period does not exceed the predetermined threshold, so that it is determined that the earthquake is not generated. In this way, it is possible to determine that the noise is generated for a relatively long vibration in which the acceleration is continuously measured for at least 1 second. As described above, in the first embodiment, it is possible to transition to the sleep mode more quickly than the comparative example, and the power consumption can be suppressed. Additionally, in the first embodiment, it is possible to prevent the generation of the interruption output due to the noise.

For the waveform C, in the earthquake determination processing of the comparative example, the acceleration is measured in the determination period immediately after the activation, and the earthquake determination value such as the difference between the maximum value and the minimum value of the acceleration exceeds the predetermined threshold, so that it is determined that the earthquake is generated. On the other hand, for the seismic processing 1, the difference between the maximum value and the minimum value of the acceleration measured in the second determination period exceeds the predetermined threshold, so that it is determined that the earthquake is generated.

<Seismic Processing 2>

Figure 7:
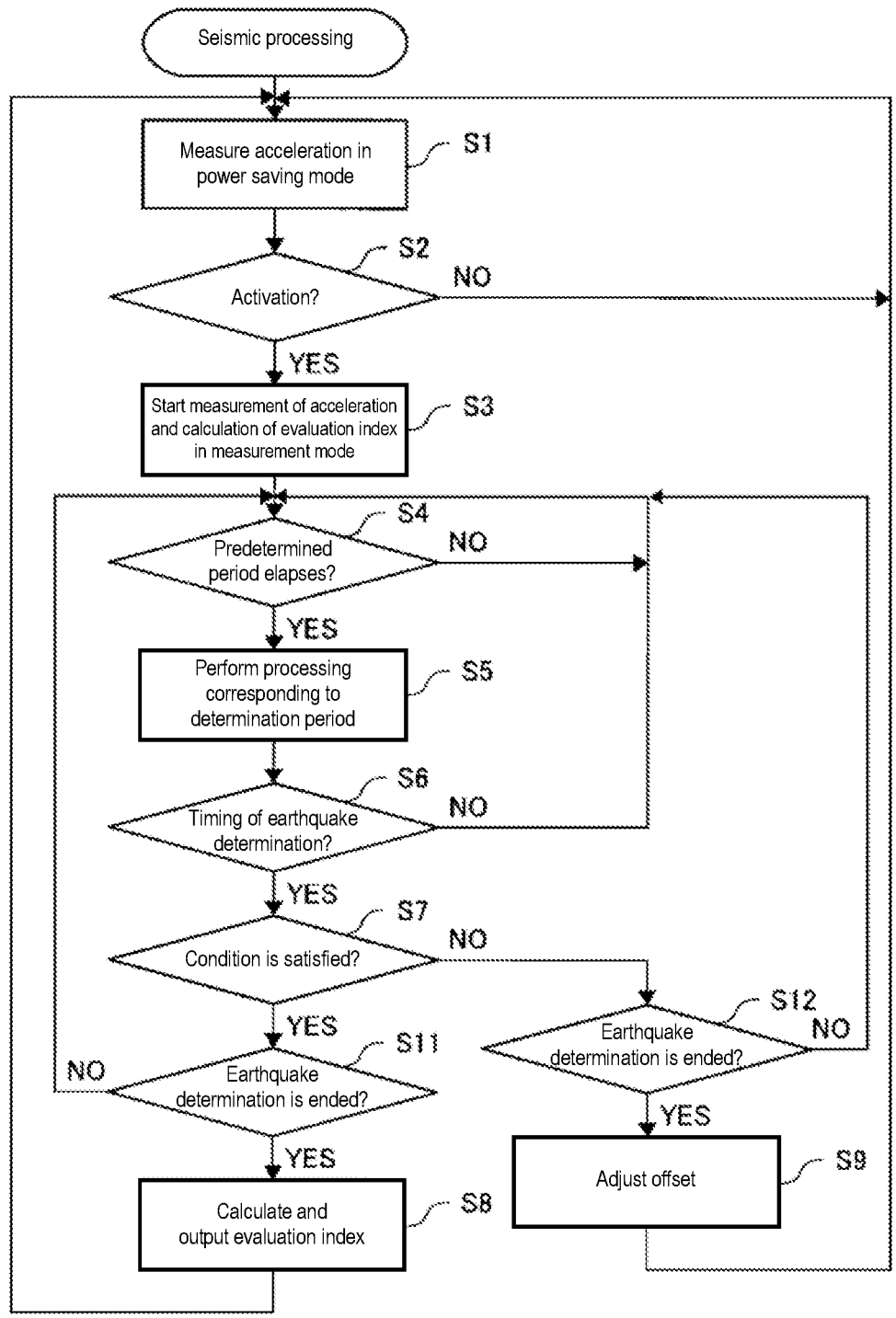
FIG. 7 is a flowchart illustrating an example of seismic processing according to a second embodiment.

FIG. 7 is a flowchart illustrating an example of seismic processing according to a second embodiment. In the second embodiment, whether to end the earthquake determination is determined in the determination period. The same processing as the processing of the first embodiment in FIG. 4 is denoted by the same reference numerals, and the description thereof is omitted. In FIG. 7, when the condition is satisfied in S7 (YES in S7), the earthquake determinator 105 determines whether to end the earthquake determination (S11). When the earthquake determinator 105 determines that the earthquake determination is ended (YES in S11), the processing proceeds to S8. On the other hand, when the earthquake determinator 105 determines that the earthquake determination is not ended (NO in S11), the processing returns to S4.

When the condition is not satisfied in S7 (NO in S7), the earthquake determinator 105 determines whether to end the earthquake determination (S12). When the earthquake determinator 105 determines that the earthquake determination is ended (YES in S12), the processing transitions to S9. On the other hand, when the earthquake determinator 105 determines that the earthquake determination is not ended (NO in S12), the processing returns to S4.

For example, when it is determined that the difference between the maximum value and the minimum value of the acceleration measured in each determination period does not exceed the predetermined threshold, it may be determined that the predetermined condition is not satisfied in S7, and it may be determined that the earthquake determination is ended in S12. That is, in each of the first and second periods, whether the earthquake is generated is determined based on the acceleration, and the measurement mode can be transitioned to the power saving mode when it is determined that the earthquake is not generated in at least one of the periods.

Figure 8:
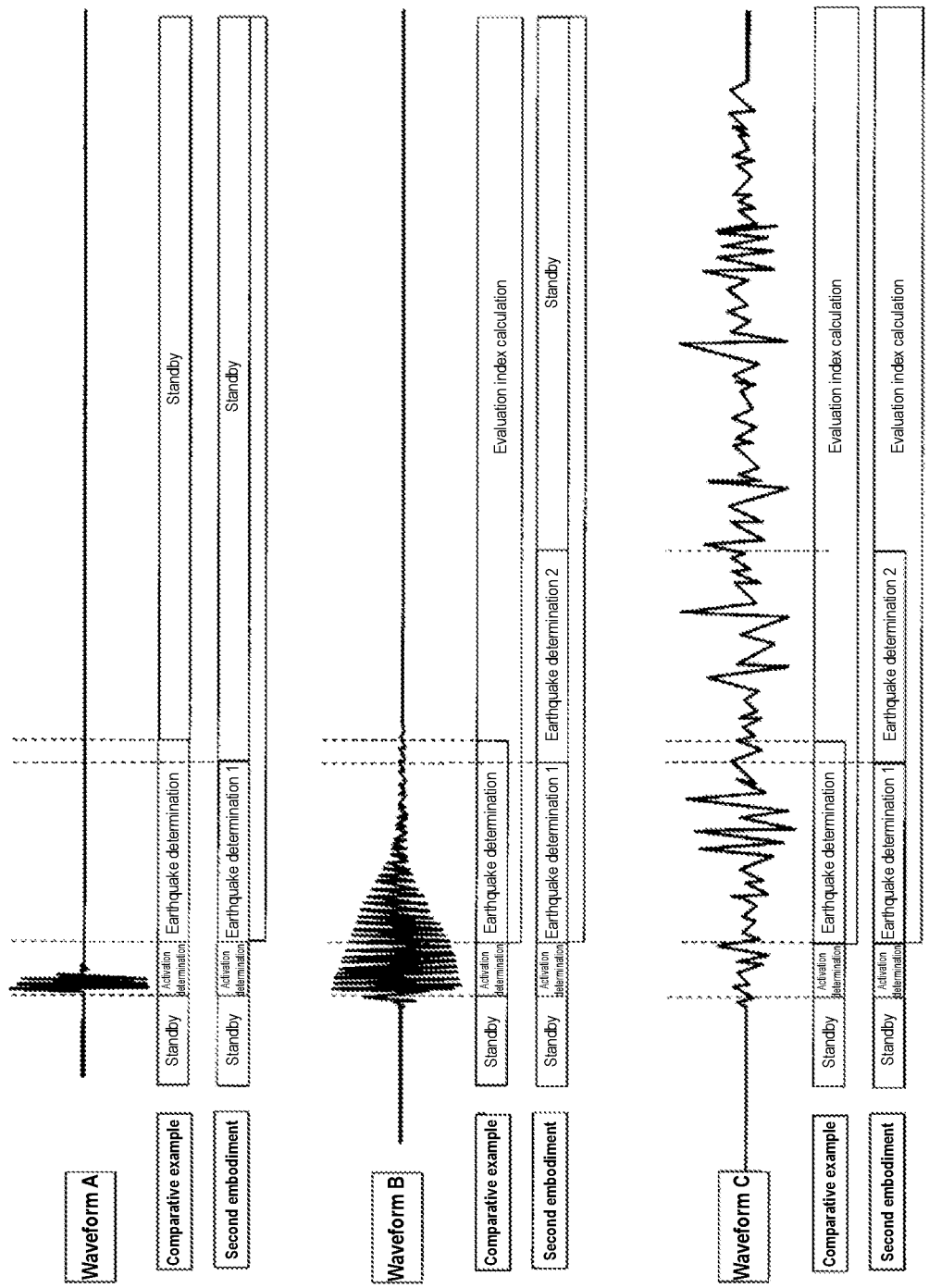
FIG. 8 is a view illustrating an earthquake determination of the second embodiment.

FIG. 8 is a view illustrating the effect of seismic processing 2. The waveforms A to C in FIG. 8 are the same as those in FIG. 6. For the waveform A, in the earthquake determination 1 of the second embodiment, it is determined that the difference between the maximum value and the minimum value of the acceleration exceeds the predetermined threshold, and the earthquake determination is ended. Consequently, when it is determined that the earthquake is not generated, the measurement mode can be transitioned to the power saving mode without performing processing relating to the subsequent determination period, and it is possible to suppress the power consumption.

The earthquake determination may not be ended until it is determined in the plurality of determination periods that the difference between the maximum value and the minimum value of the acceleration exceeds the predetermined threshold. For example, when it is determined that the predetermined condition is satisfied in S7 three times in four determination periods, it may be determined in S11 that the earthquake determination is ended. That is, it is determined that the earthquake is generated at a point of time the number of times at which a predetermined determination condition to be determined based on acceleration is satisfied exceeds the predetermined threshold among the plurality of periods, and the measurement mode may be transitioned to the power saving mode at a point of time it is found that the number of times does not exceed the predetermined threshold.

Figure 9:
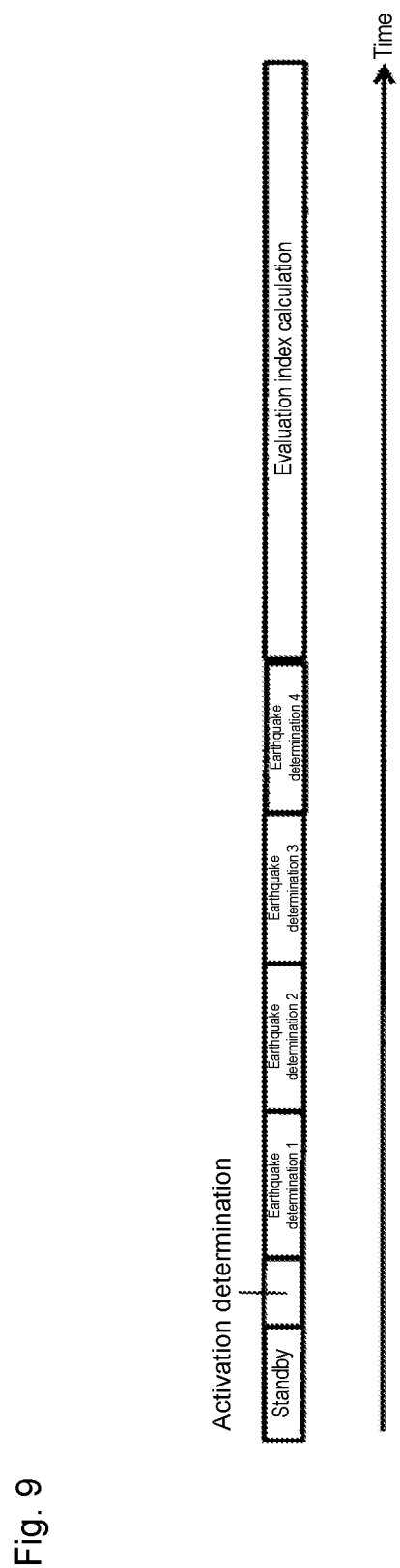
FIG. 9 is a view illustrating the earthquake determination of the second embodiment.

FIG. 9 is a view illustrating the effect of the seismic processing 2. The example of FIG. 9 includes pieces of processing of the earthquake determination 1 to earthquake determination 4 performed in four determination periods. For example, when it is determined that the predetermined condition is satisfied in any three of the four determination periods, it is determined that the earthquake is generated. Consequently, the condition of the earthquake determination can be defined in more detail, and it is possible to immediately transition to the subsequent processing at a point of time it is determined whether the earthquake is generated.

The earthquake determination may not be ended until it is continuously determined in the plurality of determination periods that the difference between the maximum value and the minimum value of the acceleration exceeds the predetermined threshold. For example, when it is determined that the predetermined condition is satisfied in S7 consecutive two times in four determination periods, it may be determined in S11 that the earthquake determination is ended. That is, it is determined that the earthquake is generated at a point of time the number of times at which a predetermined determination condition to be determined based on acceleration is continuously satisfied exceeds the predetermined threshold among the plurality of periods, and the measurement mode may be transitioned to the power saving mode at a point of time it is found that the number of times does not exceed the predetermined threshold.

For example, in the example of FIG. 9, when it is determined that the predetermined condition is satisfied in consecutive two of the four determination periods, it is determined that the earthquake is generated. With such a configuration as well, the condition of the earthquake determination can be defined in more detail, and it is possible to immediately transition to the subsequent processing at a point of time it is determined whether the earthquake is generated.

<Modification of Earthquake Determination Value>

In addition to the difference between the maximum value and the minimum value, the acceleration measured during a predetermined period or the average value of its filter values, a sum of the average value and a variance value (or standard deviation value), the variance value, an integrated value, a rate of change, a frequency, a spectrum, an integral value, the SI value, the maximum acceleration value, a response speed value, the maximum speed value, and the maximum displacement amount may be used as the earthquake determination value. That is, various values corresponding to the acceleration measured in each determination period can be used. In the case that the obtained value and the predetermined threshold satisfy the predetermined magnitude relationship, it is determined that the earthquake is generated. In the case that the sum of the average value and the variance value is used, for example, assuming that $\sigma$ is the standard deviation, a value obtained by multiplying $\sigma$ by a predetermined coefficient may be treated as the variance value. Consequently, in the case that the noise component following a normal distribution is detected, the activation due to the noise can be prevented. The integrated value may be a value obtained by adding the accelerations measured in predetermined sampling cycles or a value obtained by adding the absolute values of the accelerations. For example, the frequency may be obtained by determining whether the peak frequency is a predetermined frequency (for example, 1 Hz). The spectrum may be determined to be an earthquake in the case that spectrum intensity of a predetermined periodic band and the predetermined threshold satisfy the predetermined magnitude relationship. Also, for example, at least two of the above values may be combined by addition, subtraction, multiplication, 5 or division.

<Modification of the Number of Earthquake Determination Conditions>

A plurality of predetermined conditions used in at least one of the plurality of determination periods may be provided. That is, in at least one of the plurality of determination periods, a plurality of conditions (also referred to as "sub-conditions") that determine whether the earthquake is generated. The earthquake determinator 105 may determine that the predetermined condition is satisfied when at least a predetermined number of sub-conditions among the plurality of sub-conditions are satisfied.

FIG. 10 is a view illustrating an example of setting of the plurality of sub-conditions for a determination period. For example, six determination periods are provided, one sub-condition is defined in each of the first and second determination periods, and two sub-conditions are defined in each of the third to sixth determination periods in time-series order. For example, in the third to sixth determination periods, the condition such that the difference between the maximum value and the minimum value of the acceleration is greater than 100 gal is defined as the first sub-condition, and the condition such that the difference between the maximum value and the minimum value of the acceleration in the current determination period the maximum acceleration in the previous determination period is larger than the difference between the maximum value and the minimum value of the acceleration in the current determination period by at least 40 gal is defined as the second sub-condition.

In the case that the condition or the sub-condition is not satisfied in each determination period, it is determined that not the earthquake but the noise is generated, and the measurement mode returns to the power saving mode. In the case that the predetermined condition is satisfied in the first and second determination periods, the processing transitions to the processing in the subsequent determination period. In the case that one of the sub-conditions is satisfied in the third to sixth determination periods, the processing transitions to the processing in the subsequent determination period. In the case that both the sub-conditions are satisfied in the third to sixth determination periods, it is determined that the earthquake is generated, and the processing transitions to the calculation of the evaluation index without performing the processing in the subsequent determination period. In the last determination period, it may be determined that the earthquake is generated even if one of the sub-conditions is satisfied. The acceleration measured in the first determination period may not be used to determine whether the earthquake is generated.

Consequently, the condition used for the determination can be defined in detail, and the power consumed in determining whether the earthquake or the noise is generated can be reduced. The determination that the earthquake is generated is made even in the middle of the earthquake determination, which allows the interruption output to be quickly output to interrupt the electricity or gas for the earthquake having large vibration strength. That is, the determination processing in the subsequent determination period can be omitted in both the case that it can be determined that the earthquake is generated and the case that it can be determined that the earthquake is not generate. At this point, not only the power consumption in the following processing can be reduced, but also the calculation of the index value can promptly be performed. When the earthquake is determined to be larger than a predetermined scale, a signal can be output in order to promptly interrupt the supply of the energy.

FIG. 11 is a view illustrating another example of the setting of the plurality of sub-conditions for the determination period. For example, the plurality of determination periods are provided, one condition is defined in the first determination period, and two sub-conditions are defined in each of the determination periods from the second determination period in time-series order. For example, in the second and third determination periods, the condition such that the difference between the maximum value and the minimum value of the acceleration is greater than 100 gal is defined as the first sub-condition, and the condition such that the difference between the maximum value and the minimum value of the acceleration in the current determination period the maximum acceleration in the previous determination period is larger than the difference between the maximum value and the minimum value of the acceleration in the current determination period by at least 10 gal is defined as the second sub-condition. In the determination periods from the fourth determination period, the condition such that the difference between the maximum value and the minimum value of the acceleration is greater than 100 gal is defined as the first sub-condition, and the condition such that the difference between the maximum value and the minimum value of the acceleration in the current determination period the maximum acceleration in the previous determination period is larger than the difference between the maximum value and the minimum value of the acceleration in the current determination period by at least 40 gal is defined as the third sub-condition. In this way, at least some of the conditions or sub-conditions may vary for each period.

In the case that the condition is not satisfied in the first determination period, it is determined that not the earthquake but the noise is generated, and the returning to the power saving mode is performed. In the case that the condition is satisfied in the first determination period, the transition to the subsequent determination period is performed. In the case that the first sub-condition is not satisfied in the second and third determination periods, it is determined that the noise is generated, and the returning to the power saving mode is performed. In the case that the first sub-condition is satisfied in the second and third determination periods, the transition to the processing in the subsequent determination period is performed. In the case that both the sub-conditions are satisfied in the second and third determination periods, it is determined that the earthquake is generated, and the transitions to the calculation of the evaluation index is performed without performing the processing in the subsequent determination period. In the case that the first sub-condition is not satisfied in the determination periods from the fourth determination period, it is determined that the noise is generated, and the returning to the power saving mode is performed. In the case that the first and third predetermined conditions are satisfied in the determination periods from the fourth determination period, the returning to the processing in the first determination period is performed.

Figure 12:
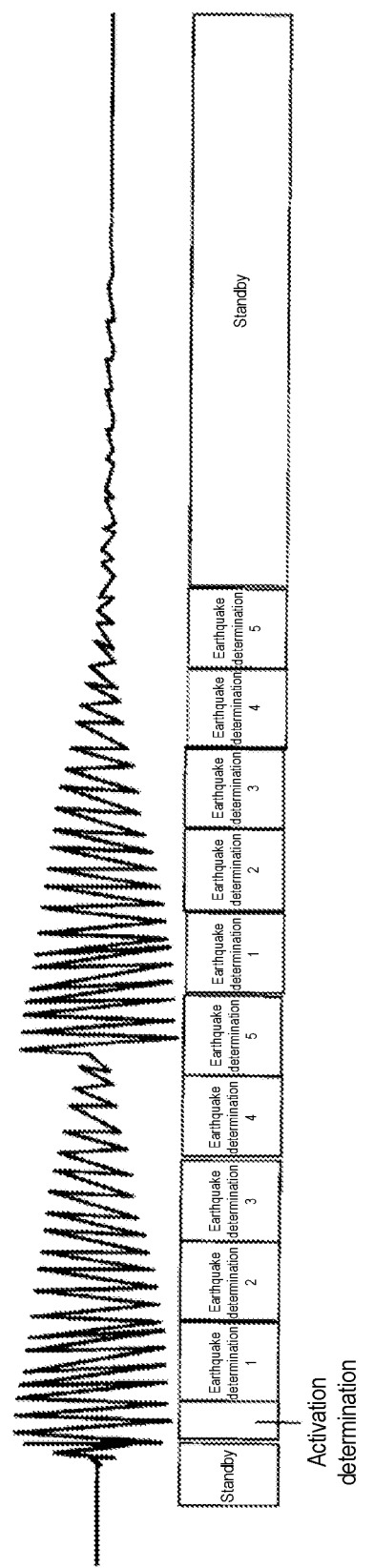
FIG. 12 is a view illustrating another example of the setting of the plurality of sub-conditions for the determination period.

FIG. 12 is a view illustrating the effect in another example of the setting of the plurality of sub-conditions in FIG. 11. A waveform of the acceleration in FIG. 12 schematically represents the case that a second noise is generated before a first noise converges. In the conditions of FIG. 11, the returning to the processing in the first determination period is performed in the case that the first sub-condition and the third sub-condition such that the difference between the maximum value and the minimum value of the acceleration in the current determination period the maximum acceleration in the previous determination period is larger than the difference between the maximum value and the minimum value of the acceleration in the current determination period by at least 40 gal are satisfied after the determination periods from the fourth determination period. That is, in the case some sort of acceleration is detected, when the acceleration due to another earthquake or noise is detected before it is determined whether the earthquake or the noise is generated, the returning to the processing in the first determination period is performed. That is, after the determination periods from the fourth determination period, in the case that the acceleration larger than that in the previous determination period by at least predetermined threshold is detected, it is determined that a new vibration is generated, and the earthquake determination can be made again.

For example, in the example of FIG. 12, it is assumed that it is determined that only the first sub-condition is satisfied in first earthquake determinations 2 to 4 (second to fourth determination periods) with respect to the first noise. It is determined that the second noise is generated before the first noise converges, and that the first and third sub-conditions are satisfied in first earthquake determination 5 (fifth determination period), and the earthquake determination is made again from the earthquake determination 1 (processing of the first determination period) with respect to the noise detected later. Neither the first nor third sub-conditions are satisfied in the second earthquake determination 5 (fifth determination period), so that the second noise can finally be determined to be the noise. As described above, the increase in power consumption and the interruption of the energy supply due to the erroneous determination can be reduced in the case that the noise continues.

FIG. 13 is a view illustrating still another example of the setting of the plurality of sub-conditions for the determination period. For example, the plurality of determination periods are provided, three sub-conditions are defined in the first to sixth determination periods, and two sub-conditions are defined in each of the determination periods from the seventh determination period in time-series order. In the first sub-condition in all the determination periods, the difference between the maximum value and the minimum value of the acceleration is greater than 100 gal in the latest three determination periods including the current determination period. In the second sub-condition in the first to sixth determination periods, the difference between the maximum value and minimum value of the acceleration in the sixth determination period is larger than the difference between the maximum value and the minimum value of the accelerations in the third to fifth determination periods by at least 10 gal. In the third sub-condition in the first to sixth determination periods, the difference between the maximum and minimum values of the acceleration in the current determination period is larger than the difference between the maximum value and the minimum value of the accelerations in the previous determination period by at least 10 gal. In the fourth sub-condition in the determination periods from the seventh determination period, the difference between the maximum and minimum values of the acceleration in the current determination period is larger than the difference between the maximum value and the minimum value of the accelerations in the previous determination period by at least 40 gal.

In the case that the first sub-condition is not satisfied in the first to sixth determination periods, it is determined that not the earthquake but the noise is generated, and the returning to the power saving mode is performed. In the case that the first sub-condition is satisfied while at least one of the second and third sub-conditions is satisfied, it is determined that the earthquake is generated, and the transition to the calculation of the evaluation index is performed. Otherwise, the transition to the subsequent determination period is performed. In the case that the first sub-condition is not satisfied in the determination periods from the seventh determination period, it is determined that the noise is generated, and the returning to the power saving mode is performed. In the case that the fourth sub-condition is satisfied in the determination periods from the seventh determination period, the processing returns to the processing in the first determination period. Otherwise, the transition to the subsequent determination period is performed. As described above, the determination may be made while the conditions and the sub-conditions are separated in detail. In particular, after the determination periods from the seventh determination period, in the case that the acceleration larger than that in the previous determination period by at least predetermined threshold is detected, it is determined that a new vibration is generated, and the earthquake determination can be made again.

<Others>

The above dynamic adjustment of the offset and the filtering of the measurement value may not be performed.

In S8, the output unit 107 not only directly outputs the evaluation index, but also generates a predetermined pulse pattern or outputs a binary signal such as on/off and high/low when the evaluation index exceeds a predetermined threshold, thereby notifying an external device that the earthquake having at least a predetermined scale is generated. When the seismic sensor 1 outputs an evaluation index, outputs the pulse pattern or the like, or is switched by the setting, a seismic sensor having compatibility with a conventional device can be provided.

DESCRIPTION OF SYMBOLS 1 seismic sensor
11 acceleration sensor
12 microcontroller
13 storage
14 output unit
15 input unit
101 acceleration measurement unit
102 acceleration storage
103 activation determinator
104 reference value storage
105 earthquake determinator
106 evaluation index calculator
107 output unit
108 offset adjuster
109 determination storage
110 filtering unit

The invention claimed is:

1. A seismic sensor that operates in a power saving mode and a measurement mode in which power consumption is larger than power consumption in the power saving mode, the seismic sensor comprising:
   a measurement unit configured to measure acceleration;
   an earthquake determinator configured to transition from the power saving mode to the measurement mode when the acceleration measured by the measurement unit exceeds a predetermined threshold, to determine whether an earthquake is generated based on the acceleration measured in the measurement mode; and
   an index calculator configured to calculate an index value indicating a scale of the earthquake when the earthquake determinator determines that the earthquake is generated,
   wherein the earthquake determinator determines whether the earthquake is generated by determining whether a predetermined condition is satisfied, the predetermined condition being determined based on the acceleration measured in at least one determination period, each determination period into which a period after the power saving mode transitions to the measurement mode is divided being set to a processing unit,
   wherein the earthquake determinator transitions from the measurement mode to the power saving mode without performing processing in a subsequent determination period when the earthquake determinator determines that the earthquake is not generated in one of a plurality of the determination periods, and
   wherein the condition in a part of the plurality of determination periods is different from the condition in other determination periods.

2. The seismic sensor according to claim 1, wherein the earthquake determinator does not perform the processing in the subsequent determination period and the index calculator calculates the index value when the earthquake determinator determines that the earthquake is generated in one of the plurality of determination periods.

3. The seismic sensor according to claim 1, wherein the earthquake determinator determines that the earthquake is generated when a number of determination periods satisfying the condition among the plurality of determination periods exceeds a predetermined threshold, and otherwise the measurement mode transitions to the power saving mode.

4. The seismic sensor according to claim 1, wherein the earthquake determinator determines that the earthquake is generated when a number of determination periods continuously satisfying the condition among the plurality of determination periods exceeds a predetermined threshold, and otherwise the measurement mode transitions to the power saving mode.

5. The seismic sensor according to claim 1, wherein it is determined that the condition is satisfied when a maximum speed value or a maximum displacement amount, which is calculated from a difference between a maximum value and a minimum value of values based on the acceleration, an average value, a sum of the average value and a variance value, the variance value, an integrated value, a rate of change, spectral intensity, an integral value, a spectrum intensity (SI) value, the maximum value, a response speed value, and the acceleration, and a predetermined threshold have a predetermined magnitude relationship or when a peak frequency is a predetermined frequency.

6. The seismic sensor according to claim 1, wherein a plurality of sub-conditions constituting the condition are defined for at least one of the plurality of determination periods, and the earthquake determinator determines that the condition is satisfied when a predetermined number or more of sub-conditions among the plurality of sub-conditions is satisfied.

7. The seismic sensor according to claim 1, wherein in a predetermined determination period among the plurality of determination periods, the earthquake determinator performs processing from processing in the determination period immediately after the power saving mode transitions to the measurement mode when a value corresponding to the acceleration measured in the determination period is larger than a value corresponding to the acceleration measured in a period before the determination period.

8. An earthquake determination method performed by a seismic sensor that operates in a power saving mode and a measurement mode in which power consumption is larger than power consumption in the power saving mode, the earthquake determination method comprising:

a measurement step of measuring acceleration;

an earthquake determination step of transitioning from the power saving mode to the measurement mode when the acceleration measured in the measurement step exceeds a predetermined threshold, to determine whether an earthquake is generated based on the acceleration measured in the measurement mode; and an index calculation step of calculating an index value indicating a scale of the earthquake when it is determined that the earthquake is generated in the earthquake determination step, wherein whether the earthquake is generated is determined by determining whether a predetermined condition is satisfied, the predetermined condition being determined based on the acceleration measured in at least one determination period, each determination period into which a period after the power saving mode transitions to the measurement mode is divided being set to a processing unit, wherein the measurement mode transitions to the power saving mode without performing processing in a subsequent determination period when it is determined that the earthquake is not generated in one of a plurality of the determination periods, and wherein the condition in a part of the plurality of determination periods is different from the condition in other determination periods.

9. The seismic sensor according to claim 2, wherein the earthquake determinator determines that the earthquake is generated when a number of determination periods satisfying the condition among the plurality of determination periods exceeds a predetermined threshold, and otherwise the measurement mode transitions to the power saving mode.

10. The seismic sensor according to claim 2, wherein the earthquake determinator determines that the earthquake is generated when a number of determination periods continuously satisfying the condition among the plurality of determination periods exceeds a predetermined threshold, and otherwise the measurement mode transitions to the power saving mode.

* * * * *